US011059737B2

(12) United States Patent
Nakanishi et al.

(10) Patent No.: US 11,059,737 B2
(45) Date of Patent: Jul. 13, 2021

(54) METHOD FOR MANUFACTURING MULTICORE OPTICAL FIBER

(71) Applicant: SUMITOMO ELECTRIC INDUSTRIES, LTD., Osaka (JP)

(72) Inventors: Tetsuya Nakanishi, Osaka (JP); Takuji Nagashima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 336 days.

(21) Appl. No.: 16/364,593

(22) Filed: Mar. 26, 2019

(65) Prior Publication Data

US 2019/0300421 A1  Oct. 3, 2019

(30) Foreign Application Priority Data

Mar. 27, 2018 (JP) .............................. JP2018-059819

(51) Int. Cl.
*C03B 37/012* (2006.01)
*C03B 37/027* (2006.01)

(52) U.S. Cl.
CPC ...... *C03B 37/01222* (2013.01); *C03B 37/027* (2013.01)

(58) Field of Classification Search
CPC ............ C03B 37/012; C03B 37/01205; C03B 37/01222; C03B 37/01228; C03B 37/01231; C03B 37/027
See application file for complete search history.

(56) References Cited

U.S. PATENT DOCUMENTS

2018/0244556 A1   8/2018  Nagashima et al.
2018/0244557 A1*  8/2018  Nagashima ....... C03B 37/01251

FOREIGN PATENT DOCUMENTS

JP   S58-217443 A   12/1983
JP   2016-175779 A  10/2016

OTHER PUBLICATIONS

Tetsuya Hayashi et al., "Design and fabrication of ultra-low crosstalk and low-loss multi-core fiber," Optics Express, Aug. 15, 2011, pp. 16576-16592, vol. 19, No. 17.
"Characterics of a single-mode optical fibre and cable," Recommendation ITU-T G.652, Telecommunication Standardization Sector of ITU (ITU-T), Nov. 2016, 3 pages.

(Continued)

*Primary Examiner* — Lisa L Herring
(74) *Attorney, Agent, or Firm* — Faegre Drinker Biddle & Reath LLP

(57) ABSTRACT

A method for manufacturing a multicore optical fiber includes a step of forming ring-shaped closed-end holes to axially extend from a first end toward a second end of a glass rod; a step of heating bottom parts of the ring-shaped closed-end holes and softening center rods surrounded by the ring-shaped closed-end holes; a step of pulling out the center rods toward a side of the first end, forming columnar closed-end holes from the ring-shaped closed-end holes, and treating the glass rod as a cladding material; a connecting step of connecting a supporting pipe to the first end; an inserting step of inserting core rods into the columnar closed-end holes after the connecting step; and a drawing step of drawing the cladding material and the core rods while heating a portion near the second end and integrating the cladding material and the core rods after the inserting step.

8 Claims, 6 Drawing Sheets

(56) References Cited

OTHER PUBLICATIONS

"Characteristics of a bending-loss insensitive single-mode optical fibre and cable," Recommendation ITU-T G.657, Telecommunication Standardization Sector of ITU (ITU-T), Nov. 2016, 5 pages.

* cited by examiner

METHOD FOR MANUFACTURING MULTICORE OPTICAL FIBER

BACKGROUND OF THE INVENTION

1. Field of the Invention

The present invention relates to a method for manufacturing a multicore optical fiber.

2. Description of the Related Art

A rod-in drawing method is one of methods for manufacturing optical fibers. A rod-in drawing method manufactures an optical fiber by inserting a core rod into a hole of a cladding material arranged in a vertical direction, and drawing the core rod and the cladding material while heating and integrating the core rod and the cladding material in a drawing furnace (see Japanese Unexamined Patent Application Publication No. 58-217443). Furthermore, Japanese Unexamined Patent Application Publication No. 2016-175779 describes a rod-in drawing method that manufactures a multicore optical fiber by using a cladding tube that has a plurality of holes formed to extend in an axial direction and core rods that each are inserted into a corresponding one of the holes.

Rod-in drawing methods have advantages as follows to increase the size of a preform of a multicore optical fiber. That is, since the plurality of holes are formed in the phase of a preform and the core rods inserted into the holes are drawn while being integrated in the drawing furnace, an integration process in the phase of the preform is not required. Moreover, since the integration and drawing are vertically performed (in a vertical direction), the preform can be easily increased in size as compared with processing with a horizontal lathe.

A method for manufacturing a multicore optical fiber disclosed in a second comparative example of Japanese Unexamined Patent Application Publication No. 2016-175779 is described with reference to the drawings. FIG. 7 is an explanatory diagram illustrating a cladding material 600 for a multicore optical fiber in this method. The left side is a longitudinal sectional view and the right side is a front view. The cladding material 600 has through holes 640 extending in an axial direction of a glass rod 610. FIG. 8 is a conceptual diagram illustrating a state where core rods 650 are inserted into the cladding material 600. To prevent the inserted core rods 650 from falling during drawing, a sealing member 630 for sealing first ends of the through holes 640 is attached by welding or another attaching method.

SUMMARY OF THE INVENTION

The present invention provides a method for manufacturing a multicore optical fiber including a rod-in drawing step without necessity of a sealing member.

A method for manufacturing a multicore optical fiber according to an aspect of the present invention is provided, the method including a step of forming a plurality of ring-shaped closed-end holes to extend from a first end toward a second end in an axial direction of a glass rod; a step of heating bottom parts of the plurality of ring-shaped closed-end holes and softening a plurality of center rods that each are surrounded by a corresponding one of the plurality of ring-shaped closed-end holes; a step of pulling out the plurality of center rods toward a side of the first end, forming a plurality of columnar closed-end holes from the plurality of ring-shaped closed-end holes, and treating the glass rod as a cladding material; a connecting step of connecting a supporting pipe to the first end of the cladding material; an inserting step of inserting core rods into the plurality of columnar closed-end holes in a one-to-one correspondence after the connecting step; and a drawing step of drawing the cladding material and the core rods while heating a portion near the second end of the cladding material and integrating the cladding material and the core rods after the inserting step.

In the method for manufacturing a multicore optical fiber according to the aspect of the present invention, the step of softening the center rods may include arranging the bottom parts of the ring-shaped closed-end holes in a heater. In the method for manufacturing a multicore optical fiber according to the aspect of the present invention, the step of pulling out the center rods preferably pulls out the center rods in a state where the glass rod vertically stands while the first end faces downward. The manufacturing method may further include a step of removing residues remaining in the columnar closed-end holes after the step of pulling out the center rods. In this case, the manufacturing method may further include a step of washing inside of the columnar closed-end holes after the step of removing the residues remaining in the columnar closed-end holes.

With the aspect of the present invention, a cladding material having a plurality of columnar closed-end holes can be manufactured without welding a sealing member as an additional member; the workability, the cost of equipment, and so forth, caused by welding the sealing member are decreased; the entry of impurities into through holes and fall of the entirety of the sealing member are prevented from occurring; and multicore optical fibers with high quality can be stably manufactured.

DESCRIPTION OF THE PREFERRED EMBODIMENTS

In the method for manufacturing a multicore optical fiber of related art disclosed in the second comparative example of Japanese Unexamined Patent Application Publication No. 2016-175779, the sealing member is used for sealing the first ends of the through holes of the cladding material. The sealing member is required to be tapered, in a step of heating a distal end portion of the preform, melting part of glass, and dropping the part of glass (dropping a droplet) at start of drawing, to reduce the size of the part of glass. The preform increases in size and the heat capacity required for welding the sealing member significantly increases, resulting in problems in view of the workability, the cost of equipment, and so forth. Moreover, moisture, organic substances, or impurities such as transition metal contained in a heat source and a heating atmosphere during welding may easily enter the sealed through holes. A problem possibly arises in quality. Furthermore, since a portion to be welded is selectively heated during drawing and easily raised to high temperatures, the entirety of the sealing member welded in the downstream step easily falls, resulting in a serious problem in stable manufacturing.

A method for manufacturing a multicore optical fiber according to a preferable embodiment of the present invention is described below with reference to the drawings. In the following description, it is assumed that configurations having the same reference sign in different drawings are the same configuration or like configurations, and its redundant description may be omitted.

Figure 1:
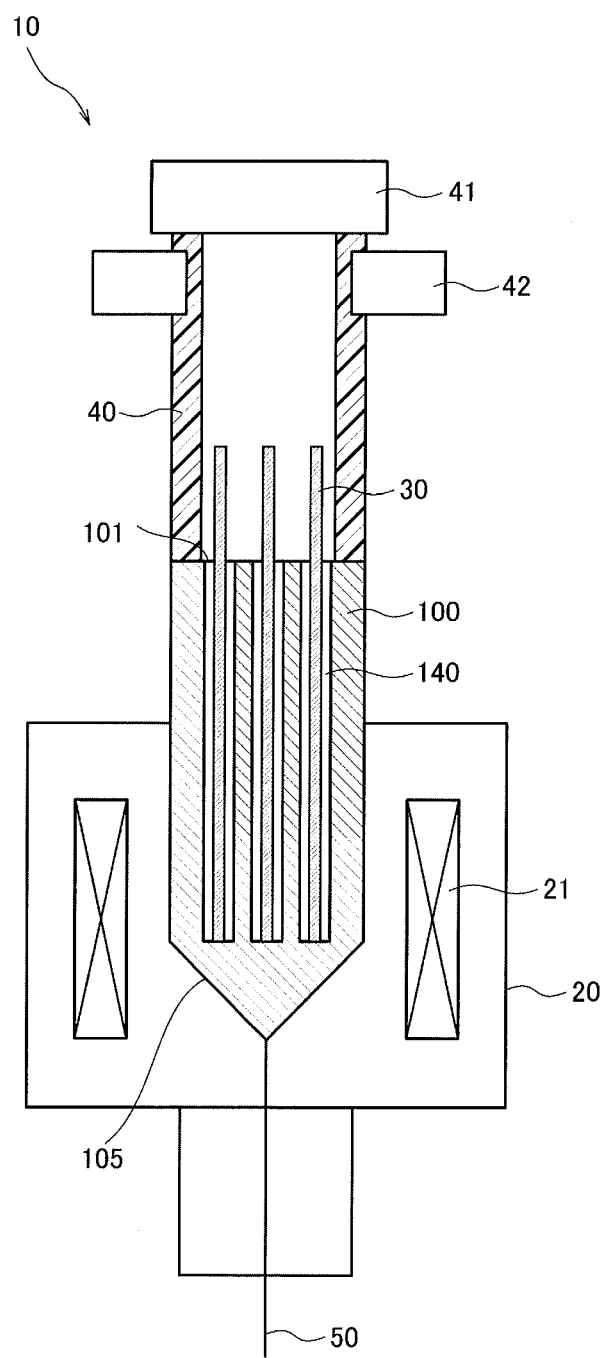
FIG. 1 is a conceptual diagram of a drawing step in a method for manufacturing a multicore optical fiber according to an embodiment of the present invention.

FIG. 1 is a conceptual diagram of a drawing step in a method for manufacturing a multicore optical fiber according to the embodiment of the present invention. In a drawing apparatus 10, a pressure controller 41, a holder 42, and a drawing furnace 20 including a heater 21 are arranged at upper and lower positions in a vertical direction. The drawing apparatus 10 manufactures a multicore optical fiber (MCF) 50 by heating, softening, melting, and integrating a cladding material 100 and a core rod 30, and drawing the integrated cladding material 100 and core rod 30 from a tapered part 105.

The method for manufacturing a multicore optical fiber according to this embodiment includes a cladding-material fabricating step, a connecting step, an inserting step, and a drawing step in that order. In the cladding-material fabricating step, the cladding material 100 is fabricated by forming a plurality of holes in a glass rod to extend in an axial direction as described later. In the connecting step, a supporting pipe 40 is connected to a first end 101 (upper end in FIG. 1) of the cladding material 100. In the inserting step, the core rod 30 is inserted into each of a plurality of columnar closed-end holes 140 (closed-end holes each having a circular cross-section) of the cladding material 100 after the connecting step. In the drawing step, after the inserting step, the tapered part 105 at a second end (lower end in FIG. 1) of the cladding material 100 is heated by the drawing apparatus 10, the cladding material 100 and the core rods 30 are softened, molten, integrated, and drawn, and thus the MCF 50 is manufactured.

Describing the drawing step more specifically, the supporting pipe 40 is held by the holder 42, and the cladding material 100 that is connected to the supporting pipe 40 and the core rods 30 that each are inserted into a corresponding one of the plurality of columnar closed-end holes 140 of the cladding material 100 are perpendicularly arranged in the drawing furnace 20. Then, the pressure controller 41 located above the supporting pipe 40 adjusts the atmosphere and atmospheric pressure in the plurality of columnar closed-end holes 140 of the cladding material 100, and the drawing furnace 20 heats lower end portions of the cladding material 100 and the core rods 30. The cladding material 100 and the core rods 30 that constitute a preform of a multicore optical fiber are heated to a temperature equal to or higher than a working point, softened, molten, and integrated; and form a droplet. The formed droplet is spun (drawn) while the outside diameter of the droplet is controlled. Thus, the MCF 50 is manufactured.

Although not illustrated, the MCF 50 drawn in the drawing furnace 20 then becomes a coated optical fiber through a coating die that applies resin and an ultraviolet (UV) furnace that hardens the resin, and is wounded by a winding bobbin. More specifically, a primary resin is applied, and the primary resin is hardened. Furthermore, a secondary resin is applied, and the secondary resin is hardened through, for example, irradiation with ultraviolet light. Thus, coating with resin layers of two layers is provided. Since the coating with resin layers of two layers or two or more layers is provided, the primary resin layer that is in contact with a bare optical fiber can inhibit an external force from being directly transmitted to the optical fiber, and furthermore, the secondary resin layer can prevent external damage.

In this case, dies for applying the resin layers may be arranged in line in the spinning step, or the resin layers may be applied by a die that simultaneously applies two layers. However, the dies are not limited thereto. In the latter case, the height of the drawing tower can be decreased, and hence the construction cost of the drawing facility can be decreased. The secondary resin layer of the two resin layers thus formed preferably has a certain thickness to maintain the resistance to external damage. In general, the thickness is preferably 20 μm or more.

The MCF 50 to be manufactured preferably complies with International Telecommunication Union, Telecommunication Standardization Sector (ITU-T) international standard G.652.D. Moreover, the MCF 50 preferably has bending loss characteristics that comply with G.657.A1, G.657.A2, and G.657.B3. Thus, the MCF 50 can be connected to a general-purpose single-mode optical fiber complying with G.652.D with a low loss, and can be treated similarly to an optical fiber of G.652.D in a transmission system.

Cores and a cladding that collectively coats the cores of the MCF 50 can employ a refractive-index structure that is conceivable by those skilled in the art, for example, step index (SI) type, graded index (GI) type, W-type, or trench-type, to obtain appropriate values for transmission characteristics including crosstalk between cores and confinement loss. The design guidance for appropriately setting crosstalk between cores and confinement loss of the MCF 50 has been theoretically clarified, and can be set with reference to the published guidance and so forth.

The cores of the MCF 50 may have the same propagation constant or different propagation constants. The MCF 50 may be an uncoupled core MCF in which each core serves as an individual channel or a coupled core MCF in which a plurality of cores serve as a super channel across the plurality of cores.

The cores of the MCF 50 each are made of a glass containing silicon dioxide ($SiO_2$) as a main component. The cladding material 100 may be made of a $SiO_2$ glass, and may contain at least one of fluorine (F) and chlorine (Cl), or may not contain fluorine or chlorine.

The core rod 30 can be manufactured by using a vapor-phase glass synthesis method, such as vapor-phase axial deposition (VAD), outside vapor deposition (OVD), modified chemical vapor deposition (MCVD), or a plasma-activated chemical vapor deposition (PCVD). Furthermore, the core rod 30 may be provided with an intermediate optical cladding layer by a method of VAD, OVD, MCVD, a rod-in-collapse method, or a method similar thereto.

In addition, drawing may be performed through a device that controls the cooling speed of glass to control the surface temperature of a bare optical fiber to a desirable temperature when the optical fiber enters the dies. A smaller Reynolds number of gas flowing through the device that controls the cooling speed is more desirable because vibration that is due to occurrence of a turbulent flow and is applied to a spun optical fiber decreases.

Feedback control may be performed on the inside temperature of the UV furnace in addition to the intensity of UV light to appropriately control the hardening speed of resin. The UV furnace may employ a magnetron or an ultraviolet light-emitting diode (LED). The light source of the UV LED does not generate heat, and hence the UV LED can be additionally provided with a mechanism that supplies hot air to raise the temperature in the furnace to an appropriate temperature. A component desorbed from the resin may stick to the inner surface of the furnace tube of the UV furnace and the power of the UV light that reaches the coating may change during drawing. Due to this, the degree of decrease in the power of the UV light during drawing may be monitored in advance, and the drawing duration may be set such that the power of the UV light to be radiated on the coating is substantially kept constant. The UV light leaking out from the furnace tube may be monitored, and the power of the UV light radiated on the coating may be controlled to be constant. This provides uniform fracture strength of an optical fiber over the entire length of the optical fiber.

Manufacturing a cladding material having a plurality of columnar closed-end holes extending in an axial direction of a glass rod includes (1) a step of forming a ring-shaped closed-end hole from a first end toward a second end in the axial direction of the glass rod, (2) a step of heating a bottom part of the ring-shaped closed-end hole and softening a center rod surrounded by the ring-shaped closed-end hole, and (3) a step of pulling out the center rod toward a side of the first end and forming a columnar closed-end hole. The steps are described below. FIGS. 2A, 2B, 4, 5, and 6 that are referenced in the following description illustrate a cladding material 100 in a lateral direction. However, the direction is not limited thereto. The first end having an opening of the columnar closed-end hole is desirably arranged at a lower side in a vertical direction.

Formation of Ring-Shaped Closed-End Hole

Figure 2A:
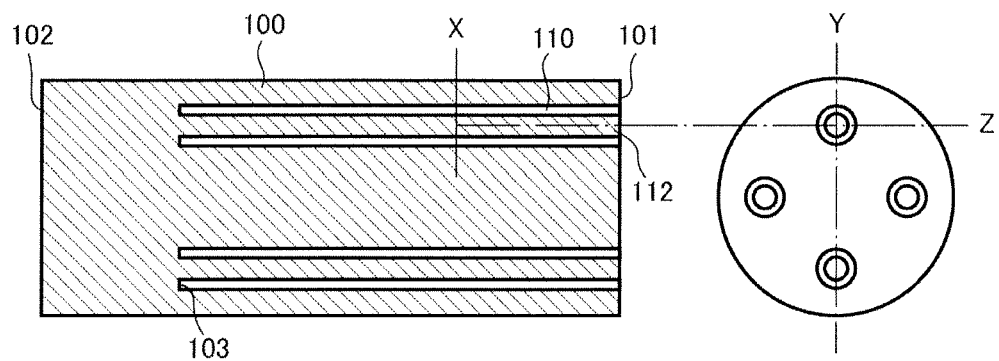
FIGS. 2A and 2B are conceptual diagrams of a cladding material having a ring-shaped closed-end hole in the method for manufacturing a multicore optical fiber according to the embodiment of the present invention, the left side of FIG. 2A being a sectional view, the right side of FIG. 2A being a front view, FIG. 2B being a perspective sectional view.
Figure 2B:
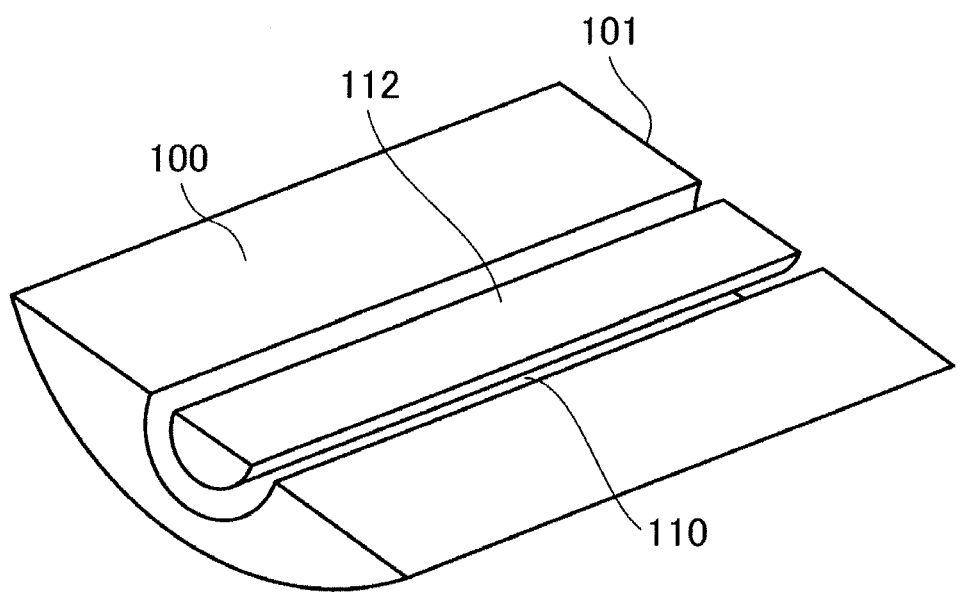

FIGS. 2A and 2B are conceptual diagrams of a cladding material 100 having a ring-shaped closed-end hole in the method for manufacturing a multicore optical fiber according to the embodiment of the present invention, the left side of FIG. 2A being a sectional view, the right side of FIG. 2A being a front view, FIG. 2B being a perspective view when a portion of the cladding material 100 is cut along lines X and Z of FIG. 2A and is viewed from below in FIG. 2A. A ring-shaped closed-end hole (a closed-end hole having a ring-shaped cross-section) 110 is formed to extend from a first end 101 toward a second end 102 in an axial direction of a glass rod serving as the cladding material 100 used in the drawing apparatus 10. The ring-shaped closed-end hole 110 has a bottom part 103 with a predetermined thickness remaining with respect to the second end 102. A plurality of the ring-shaped closed-end holes 110 are formed. A center rod 112 is formed in a state surrounded by a ring being a space.

Figure 3:
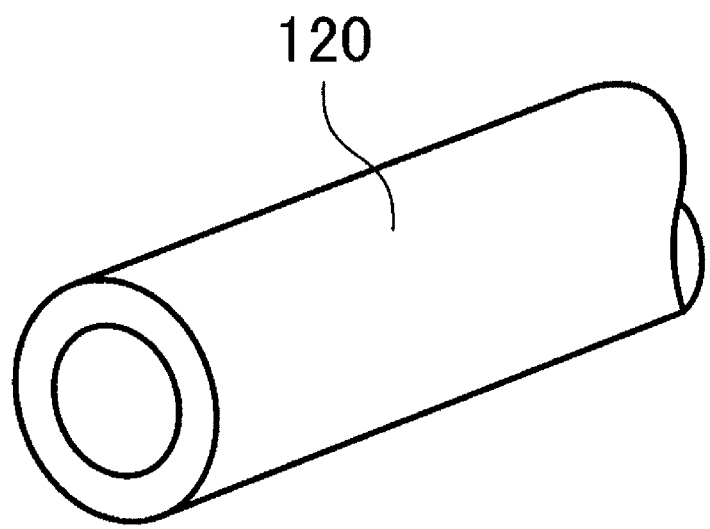
FIG. 3 is a perspective view illustrating an example of a tool for forming a ring-shaped closed-end hole in FIGS. 2A and 2B.

FIG. 3 is a perspective view illustrating an example of a tool for forming a ring-shaped closed-end hole. To mechanically bore a hole in glass, a pipe-shaped cutting tool 120 having diamond or the like at its distal end is typically used. However, the boring method is not limited thereto. When a hole is bored in the cladding material 100 with the pipe-shaped cutting tool 120 having diamond or the like at its distal end, the center rod 112 is arranged in a state surrounded by the ring-shaped closed-end hole 110 extending from the first end 101. A plurality of the ring-shaped closed-end holes 110 are formed. While four ring-shaped closed-end holes 110 are illustrated in FIG. 2B as an example, the number of holes and the positions of holes can be appropriately set in accordance with the state of drawing, the size of the cladding material, and so forth.

Softening of Center Rod Surrounded by Ring-Shaped Closed-End Hole

Figure 4:
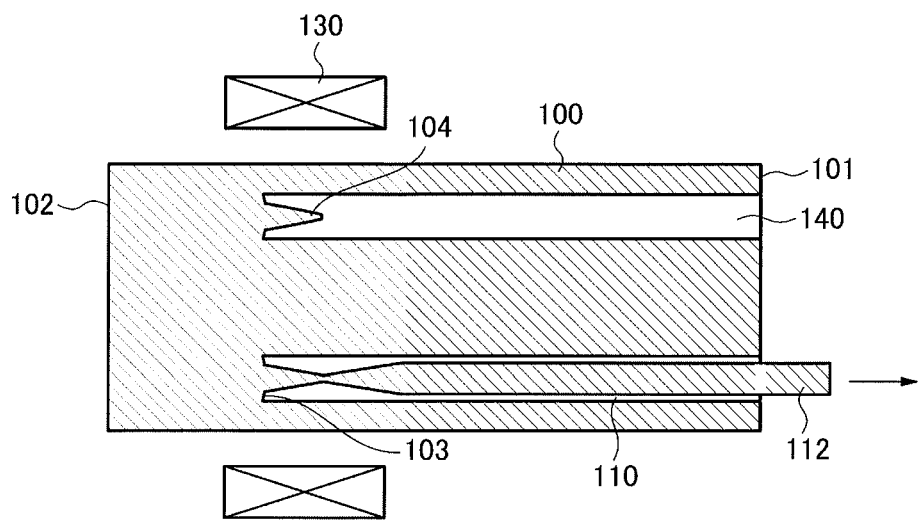
FIG. 4 is a conceptual diagram explaining a step of softening and pulling out a center rod in the method for manufacturing a multicore optical fiber according to the embodiment of the present invention.

FIG. 4 is a conceptual diagram explaining a step of softening and pulling out a center rod in the method for manufacturing a multicore optical fiber according to the embodiment of the present invention. After the ring-shaped closed-end hole 110 is formed, a heater 130 is arranged around the periphery of the bottom part 103 of the ring-shaped closed-end hole 110 of the cladding material 100, and the heater 130 heats the periphery of the bottom part 103. The heater 130 may employ an electric furnace, such as a resistance furnace, an arc furnace, or an induction furnace; or a fuel furnace. However, the furnace is not limited thereto. By heating the periphery of the bottom part 103 with far-infrared rays using the heater 130, the bottom part 103 of the center rod 112 in each of the plurality of ring-shaped closed-end holes 110 can be substantially uniformly softened and partly molten.

Removal of Center Rod

After the bottom part 103 of the center rod 112 is substantially uniformly softened and partly molten, when the center rod 112 is pulled toward a side of the first end 101 (arrow direction) as illustrated in a lower section of FIG. 4, the center rod 112 is extended near the bottom part 103 and then is cut. After the center rod 112 is cut, a columnar closed-end hole 140 is formed in a state where a remnant 104 after cutting partly remains at the bottom part 103 as illustrated in an upper section of FIG. 4. With the configuration for heating with the heater 130, the center rod 112 can be easily pulled out, and the columnar closed-end hole 140 can be easily formed. Note that, by pulling out the center rod in the vertical direction, a residue after the center rod is pulled out less likely remains in the columnar closed-end hole.

In the state where the center rod 112 has been pulled out, the tapered remnant 104 facing toward the first end 101 remains in the bottom part 103 of the columnar closed-end hole 140. If such a residue remains, a residue piece may be generated when a core rod is inserted into the columnar closed-end hole, and the residue piece may be mixed into the interface between the columnar closed-end hole and the core rod. This is not preferable. If the residue piece is mixed, the optical characteristics and mechanical characteristics of the drawn multicore optical fiber may be degraded.

Figure 5:
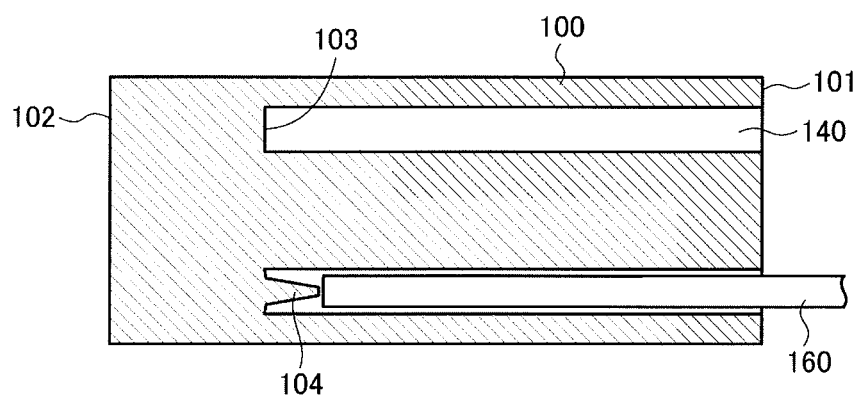
FIG. 5 is a conceptual diagram explaining a step of removing a residue of the center rod in the method for manufacturing a multicore optical fiber according to the embodiment of the present invention.

FIG. 5 is a conceptual diagram explaining a step of removing the residue of the center rod in the method for manufacturing a multicore optical fiber according to the embodiment of the present invention. As illustrated in a lower section of FIG. 5, a honing tool 160 such as a solid pointing tool may be inserted into the columnar closed-end hole 140 to mechanically remove the residue. However, the removing method is not limited to such a mechanically removing method. For example, the residue may be irradiated with carbon dioxide laser beams, molten or vaporized, and removed. When the residue is molten, melting may be carried out such that the opening of the columnar closed-end hole faces downward in the vertical direction to suppress sticking of the residue to a wall surface of the columnar closed-end hole.

By removing the residue such as the remnant 104, the columnar closed-end hole 140 is in a state as illustrated in an upper section of FIG. 5. Then, in the columnar closed-end hole 140, it is preferable to further perform a washing step using a hydrogen fluoride aqueous solution or the like. In the columnar closed-end hole 140, a grinding fluid, residues of grinding, and multiple pieces of glass may remain. If the columnar closed-end hole 140 is used as a jacket of the MCF 50 in this state, the optical characteristics and mechanical characteristics of the multicore optical fiber are degraded. With this configuration, since the step of washing the columnar closed-end hole is further included, the inside of the columnar closed-end hole can be cleaned. The washing fluid may employ the hydrogen fluoride aqueous solution; however, the washing fluid is not limited thereto. Since the step of removing a residue remaining in the columnar closed-end hole is further included, a multicore optical fiber with further high quality can be stably manufactured.

Figure 6:
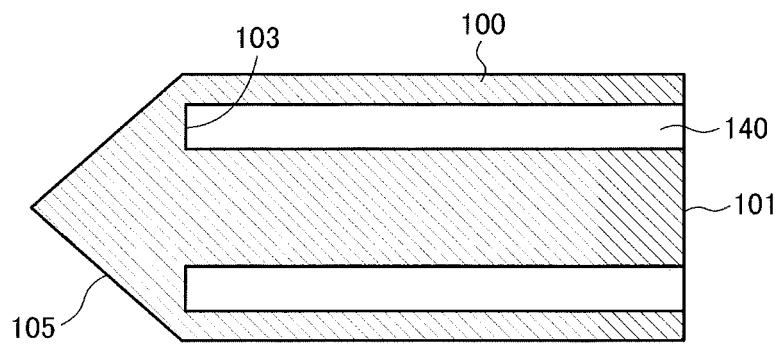
FIG. 6 is a sectional view of a cladding material in the method for manufacturing a multicore optical fiber according to the embodiment of the present invention.
Figure 7:
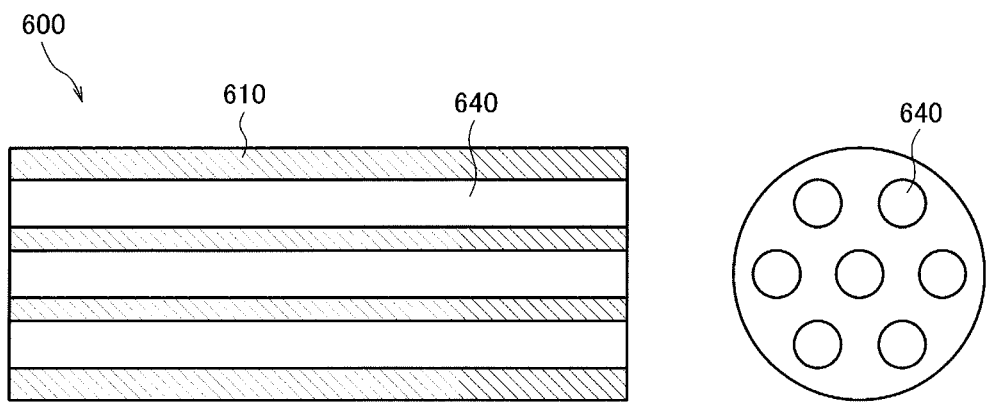
FIG. 7 is an conceptual diagram illustrating a cladding material for a multicore optical fiber according to related art, the left side of FIG. 7 being a longitudinal sectional view, the right side of FIG. 7 being a front view.
Figure 8:
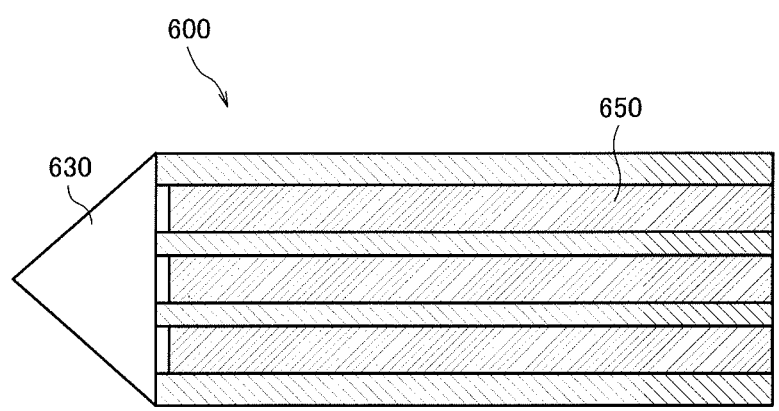
FIG. 8 is a conceptual diagram illustrating a state where core rods are inserted into the cladding material in FIG. 7.

FIG. 6 is a sectional view of the cladding material used in the method for manufacturing a multicore optical fiber according to the embodiment of the present invention. A portion near the second end 102 is tapered and hence a tapered part 105 is formed for drawing. In the steps in FIGS. 2A, 2B, 4, 5, 6, and 6, to cause the removed residue to fall and to discharge the washing fluid, the first end 101 having the opening of the columnar closed-end hole 140 is desirably arranged at the lower side in the vertical direction.

The aspect of the present invention are not limited to the above-described embodiment, and modifications are available within the scope of the invention.

REFERENCE SIGNS LIST

| 10  | drawing apparatus, |
| 20  | drawing furnace, |
| 21  | heater, |
| 30  | core rod, |
| 40  | supporting pipe, |
| 41  | pressure controller, |
| 50  | multicore optical fiber, |
| 100 | cladding material, |
| 101 | first end, |
| 102 | second end, |
| 103 | bottom part, |
| 104 | remnant, |
| 105 | tapered part, |
| 110 | ring-shaped closed-end hole, |
| 112 | center rod, |
| 120 | cutting tool, |
| 130 | heater, |
| 140 | columnar closed-end hole, |
| 160 | honing tool, |
| 600 | cladding material, |
| 610 | glass rod, |
| 630 | sealing member, |
| 640 | through hole, |
| 650 | core rod |

What is claimed is:

1. A method for manufacturing a multicore optical fiber, the method comprising:
   a step of forming a plurality of ring-shaped closed-end holes to extend from a first end toward a second end in an axial direction of a glass rod;
   a step of heating bottom parts of the plurality of ring-shaped closed-end holes and softening a plurality of center rods that each are surrounded by a corresponding one of the plurality of ring-shaped closed-end holes;
   a step of pulling out the plurality of center rods toward a side of the first end, forming a plurality of columnar closed-end holes from the plurality of ring-shaped closed-end holes, and treating the glass rod as a cladding material;
   a connecting step of connecting a supporting pipe to the first end of the cladding material;
   an inserting step of inserting core rods into the plurality of columnar closed-end holes in a one-to-one correspondence after the connecting step; and
   a drawing step of drawing the cladding material and the core rods while heating a portion near the second end of the cladding material and integrating the cladding material and the core rods after the inserting step.

2. The method for manufacturing a multicore optical fiber according to claim 1,
   wherein the step of pulling out the center rods includes pulling out the center rods in a state where the glass rod vertically stands while the first end faces downward.

3. The method for manufacturing a multicore optical fiber according to claim 2, further comprising a step of removing residues remaining in the columnar closed-end holes after the step of pulling out the center rods.

4. The method for manufacturing a multicore optical fiber according to claim 3, further comprising a step of washing inside of the columnar closed-end holes after the step of removing the residues remaining in the columnar closed-end holes.

5. The method for manufacturing a multicore optical fiber according to claim 1,
   wherein the step of softening the center rods includes arranging the bottom parts in a heater.

6. The method for manufacturing a multicore optical fiber according to claim 5,
   wherein the step of pulling out the center rods includes pulling out the center rods in a state where the glass rod vertically stands while the first end faces downward.

7. The method for manufacturing a multicore optical fiber according to claim 6, further comprising a step of removing residues remaining in the columnar closed-end holes after the step of pulling out the center rods.

8. The method for manufacturing a multicore optical fiber according to claim 7, further comprising a step of washing inside of the columnar closed-end holes after the step of removing the residues remaining in the columnar closed-end holes.

* * * * *